United States Patent [19]
Agaskar et al.

[11] Patent Number: 5,550,308
[45] Date of Patent: Aug. 27, 1996

[54] VANADIUM (IV)-CONTAINING NASICON MATERIALS

[76] Inventors: Pradyot A. Agaskar, 55 Cliveden Ct., Lawrenceville, N.J. 08648; Robert K. Grasselli, 12 Black Rock Rd., Chadds Ford, Pa. 19317

[21] Appl. No.: 312,580

[22] Filed: Sep. 27, 1994

Related U.S. Application Data

[62] Division of Ser. No. 50,794, Apr. 22, 1993, Pat. No. 5,354,722.

[51] Int. Cl.$^6$ .......................... C07C 5/09; C07D 307/34
[52] U.S. Cl. .......................... 585/623; 585/622; 549/259; 549/260
[58] Field of Search .................. 585/62.2, 623; 549/260, 259

[56] References Cited

U.S. PATENT DOCUMENTS 5,354,722  10/1994  Agaskar et al. ..................... 502/209

Primary Examiner—Asok Pal
Assistant Examiner—Bekir L. Yildirim

[57] ABSTRACT

The present invention provides a composition of matter having the formula $$A_xB_{1-x}V_yC_{1-y}P_3O_{10-15}$$

wherein A is Nb or Ta, B is Sb, C is Ti or Sn, and $0 \leq x, y \leq 1$, a composition of matter having the formula $$M_zA_xB_{1-x}V_yC_{1-y}P_3O_{10-15}$$

wherein M is selected from the group consisting of Cu, Ag, Na, K, and Cs, A is Nb or Ta, B is Sb, C is Ti or Sn, and $0 \leq x, y, z \leq 1$, a composition of matter having the formula $$M_zA_xB_{1-x}V_yC_{1-y}P_{3-n}Si_nO_{10-15}$$

wherein M is selected from the group consisting of Cu, Ag, Bi, Na, K, Rb, and Cs, A is Nb or Ta, B is Sb or As, C is Ti, Zr, Sn, or Ge, and $0 \leq x, z \leq 1$, $0 < y \leq 1$, and $0 \leq n \leq 2$, and conversion processes catalyzed by at least one of the composition.

14 Claims, 2 Drawing Sheets

VANADIUM (IV)-CONTAINING NASICON MATERIALS

This is a division of application Ser. No. 08/050,794, filed on Apr. 22, 1993, now U.S. Pat. No. 5,354,722.

FIELD OF THE INVENTION

This invention relates to mixed metal phosphates. The invention further relates to mixed metal phosphates having a NASICON (Sodium (Na) Super Ionic Conductor) structure. Particularly, the invention relates to a vanadium (IV)-containing composition of matter having the structure of a NASICON material. The invention further provides a method for upgrading organic feedstocks.

BACKGROUND OF THE INVENTION

The NASICON structure has been reported to consist of a three-dimensional framework built up from $PO_4$ tetrahedra and $MO_6$ octahedra, where M is a metal ion which has been incorporated into the NASICON framework. The $PO_4$ and $MO_6$ tetrahedra are believed to share vertices to form secondary building units of the general formula $M_2(PO_4)_3$. These building units are reported to be stacked along the c-axis to form fairly large cavities that are interlinked to form tunnels. These tunnels are believed to contain sodium.

The NASICON phases initially attracted attention because of the high mobility of Na+ ions in the tunnels of the parent phase $Na_3Zr_2Si_2PO_{12}$, giving rise to high ionic conductivity and use in fuel cells. P. Hagenmuller and W. Van Gool *Solid Electrolytes* Academic Press, New York (1978). The stability of the NASICON framework and its ability to form solid solutions containing a wide variety of elements has also been exploited in the preparation of zero thermal expansion coefficient (ZTEC) materials. A. El Jazouli et al. C.R.Acad.Sc.Paris t.300, Serie II, n° 11, 1985, 493–496. More recently, the isostructural phases with copper substituted for sodium have been reported to be catalytically active for decomposition of alcohols. A. Serghini et al., J. Chem. Soc., Faraday Trans., 1991, 87,2487–2491.

For a discussion of synthesizing vanadium-containing NASICON materials, see A. Bermoussa et al., Journal of Solid State Chemistry 97, 314–318 (1992), and J. Gopalakrishnan et al., Chemistry of Materials, Vol. 4, No. 4, 745–747 (July/August 1992).

The material of this invention is a useful catalyst for upgrading organic feedstocks. The material promotes partial oxidation reactions, such as the reaction of n-$C_4$ to form products less deeply oxidized than CO and $CO_2$ (such as maleic anhydride, furan, and butadiene) at temperatures below 400° C. The material also catalyzes the reaction of alkylaromatics, e.g., o-xylene, to aromatic oxygenates e.g., phthalic anhydride. Phthalic anhydride can be used in preparing alkyl, amino, and epoxy resins, as a flame retardant, rubber retarded, or as an ester for plasticizers and polyesters.

SUMMARY OF THE INVENTION

The present invention provides a composition of matter having the formula $$A_xB_{1-x}V_yC_{1-y}P_3O_{10-15}$$

wherein A is Nb or Ta, B is Sb or As, C is Ti, Zr, Sn, or Ge, and $0 \leq x \leq 1$, $0 < y \leq 1$.

The invention further provides a composition of matter having the formula $$M_zA_xB_{1-x}V_yC_{1-y}P_3O_{10-15}$$

wherein M is selected from the group consisting of Cu, Ag, Bi, Na, K, Rb, and Cs, A is Nb or Ta, B is Sb, C is Ti or Sn, and $0 \leq x,z \leq 1$, $0 < y \leq 1$.

The invention further provides a composition of matter having the formula $$M_zA_xB_{1-x}V_yC_{1-y}P_{3-n}Si_nO_{10-15}$$

wherein M is selected from the group consisting of Cu, Ag, Bi, Na, K, Rb, and Cs, A is Nb or Ta, B is Sb or As, C is Ti, Zr, Sn, or Ge, and $0 \leq x,z \leq 1$, $0 < y \leq 1$, and $0 \leq n \leq 2$.

The invention still further provides methods for oxidizing organic feedstocks, particularly hydrocarbons, in the presence of the materials of the invention.

EMBODIMENTS

Figure 1:
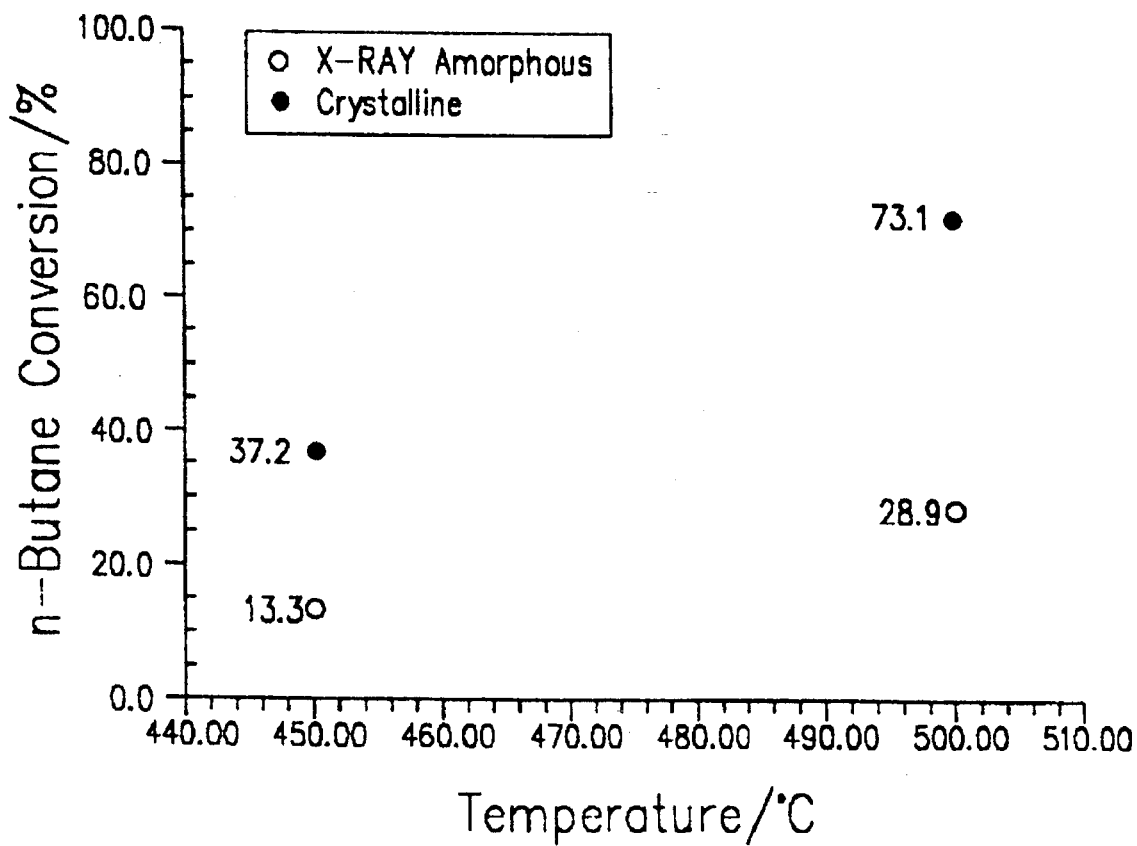
FIG. 1 compares n-butane conversion (y-axis, weight percent) as a function of temperature (x-axis, °C) in the presence of oxygen and two catalyst compositions of the invention. The open circles represent data for conversion in the presence of a material of the invention having the formula $NbV_{0.5}Ti_{0.5}P_3O_x$ which has been heated to a temperature of about 450° C. The solid circles represent data for conversions in the presence of a material having the formula $NbV_{0.5}Ti_{0.5}P_3O_x$ which has been heated to a temperature of at least 700° C.

The niobium-containing materials of the invention (e.g., $NbVP_3O_{12}$) may still further be characterized by their x-ray diffraction pattern, which includes the d-spacings shown below in Table 1.

TABLE 1

| d | Relative Intensity ($I/I_o$) (100) |
|---|---|
| 6.18 ± 0.03 | s |
| 4.43 ± 0.02 | vs |
| 4.31 ± 0.02 | s |
| 3.714 ± 0.008 | vs |
| 3.562 ± 0.008 | w |
| 3.087 ± 0.008 | vs |
| 3.018 ± 0.004 | w |
| 2.793 ± 0.004 | s |
| 2.584 ± 0.004 | w |
| 2.508 ± 0.004 | m |
| 2.484 ± 0.004 | m |
| 2.214 ± 0.004 | w |
| 2.128 ± 0.004 | w |
| 2.060 ± 0.004 | w |
| 1.968 ± 0.002 | w |
| 1.935 ± 0.002 | w |
| 1.897 ± 0.002 | w |
| 1.856 ± 0.002 | w |
| 1.836 ± 0.002 | w |

The antimony-containing materials of the invention (e.g., $SbVP_3O_{12}$) may still further be characterized by their x-ray diffraction pattern, which includes the d-spacings shown in Table 2.

TABLE 2

| d | Relative Intensity $(I/I_o)$ (100) |
|---|---|
| 6.00 ± 0.03 | s |
| 4.46 ± 0.02 | vs |
| 4.14 ± 0.02 | s |
| 3.960 ± 0.008 | vs |
| 3.842 ± 0.008 | w |
| 3.611 ± 0.008 | s |
| 3.074 ± 0.004 | w |
| 3.008 ± 0.004 | s |
| 2.912 ± 0.004 | w |
| 2.751 ± 0.004 | s |
| 2.694 ± 0.004 | w |
| 2.622 ± 0.004 | w |
| 2.436 ± 0.004 | m |
| 2.392 ± 0.004 | m |
| 2.276 ± 0.002 | w |
| 2.186 ± 0.002 | w |
| 2.108 ± 0.002 | w |
| 2.074 ± 0.002 | w |
| 2.006 ± 0.002 | w |
| 1.933 ± 0.002 | w |
| 1.875 ± 0.002 | w |
| 1.807 ± 0.002 | w |

The antimony- and titanium-containing materials of the invention (e.g., $SbTi_{0.5}V_{0.5}P_3O_{12}$) may still further be characterized by their x-ray diffraction pattern, which includes the d-spacings shown in Table 3.

TABLE 3

| d | Relative Intensity $(I/I_o)$ (100) |
|---|---|
| 6.03 ± 0.03 | s |
| 4.36 ± 0.02 | vs |
| 4.16 ± 0.02 | s |
| 3.943 ± 0.008 | w |
| 3.842 ± 0.008 | w |
| 3.619 ± 0.008 | s |
| 3.520 ± 0.004 | w |
| 3.215 ± 0.004 | w |
| 3.013 ± 0.004 | s |
| 2.917 ± 0.004 | w |
| 2.751 ± 0.004 | s |
| 2.571 ± 0.004 | w |
| 2.442 ± 0.004 | m |
| 2.401 ± 0.004 | m |
| 2.281 ± 0.002 | w |
| 2.186 ± 0.002 | w |
| 2.108 ± 0.002 | w |
| 2.083 ± 0.002 | w |
| 2.010 ± 0.002 | w |
| 1.935 ± 0.002 | w |
| 1.879 ± 0.002 | w |
| 1.811 ± 0.002 | w |

These X-ray diffraction data were collected with a Scintag diffraction system, equipped with a germanium solid state detector, using copper K-alpha radiation ($\lambda=1.541780$). The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history.

Catalysis

The material of this invention is useful as a catalyst for upgrading organic feedstocks. The material can be shaped into a wide variety of particle sizes. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded, such as by extrusion, the material can be extruded before drying or partially dried and then extruded.

It may be desired to incorporate the material with another material which is resistant to the temperatures and other conditions employed in the catalytic processes described herein. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with material, i.e., combined therewith or present during its synthesis, which itself is catalytically active may change the conversion and/or selectivity of the catalyst. Inactive materials suitably serve as diluents to control the amount of conversion so that products can be obtained economically and orderly without employing other means for controlling the rate of reaction. These materials may be incorporated into naturally occurring clays e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use, it is desirable to prevent the catalyst from breaking down into powder-like materials. These clay binders have been employed normally only for the purpose of improving the crush strength of the catalyst.

Naturally occurring clays which can be composited with materials include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with materials also include inorganic oxides, notably alumina.

In addition to the foregoing materials, the materials can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of finely divided materials and inorganic oxide matrix vary widely, with the material content ranging from about 1 to about 90 percent by weight and more usually, particularly when the composite is prepared in the form of beads, in the range of about 2 to about 80 weight of the composite.

The material is particularly effective for selectively oxidizing a hydrocarbon feed such as o-xylene to form aromatic oxygenates such as phathalic anhydride. The reaction may be carried out in a fixed or fluid bed. U.S. Pat. No. 4,889,839 to Chu et al. teaches process configurations and conversion conditions for selectively oxidizing hydrocarbon feeds in the presence of a solid catalyst and is incorporated by reference as if set forth at length herein.

The material of the invention catalyzes partial oxidation reactions (such as the conversion of o-xylene to phthalic anhydride) in the presence of oxygen under conversion conditions including temperature of from about 100° to about 500° C., preferably from about 200° to about 350° C., pressure of from about 0 to about 100 psig, and LHSV sufficient for achieve the desired conversion, typically from about 0.1 to about 20, preferably from about 0.2 to about 5.0. The ratio of oxygen to o-xylene typically ranges from about 5 to about 20.

EXAMPLES

Starting Materials: Columbium oxalate ($Nb(HC_2O_4)_5$) was obtained from Atomergic Chemetals Corp. Ammonium vanadate ($NH_4VO_3$), antimony(III) oxide ($Sb_2O_3$), diammonium hydrogen Phosphate ($(NH_4)_2HPO_4$), oxalic acid ($H_2C_2O_4$), and citric acid ($H_8C_6O_7$) were obtained from Aldrich Chemical Co.

Example 1

Preparation of $NbVP_3O_{12}$

I. The following three solutions were prepared:

S1: $NH_4VO_3$(3.0g, 0.0256 mil)+$H_2C_2O_4 \cdot 2H_2O$ (7.0g, 0.053 mil)+$H_2O$ (100mL).

The color changed to deep blue in less than 1 hour, indicative of the formation of $VO^{2+}$. The solution was heated and stirred for a further 60 hours.

S2: $Nb(HC_2O_4)_5$ (13.77g, 0.0256 mil)+$H_2C_2O_4 \cdot 2H_2O$ (7.0g, 0,053 mil)+$H_2O$ ( 350 mL).

The solution was slightly turbid even after heating for 60 hours.

S3: $(NH_4)_2HPO_4$ (10.16g, 0.077 mil)+$H_2O$ (100 mL).

S1 was added to S2 and then S3 was added to the mixture. The slightly turbid blue solution was allowed to dry completely on a hot-plate and the residue was collected, ground, placed in a fused quartz crucible and heated under a nitrogen atmosphere to 600° C. and 3° C. $\min^{-1}$. The temperature was held constant for 10 hours and allowed to return to ambient. The green powder was reground and heated to 600° C. under nitrogen atmosphere at 25° C. min−1 and held at that temperature for 15 hours. The green product exhibited a featureless x-ray diffraction pattern. The green powder was then reheated to 900° C. under nitrogen atmosphere and held at that temperature for 40 hours. II. A mixture containing $NH_4VO_3$(6.0g, 0.0512mil) , $Nb(HC_2O_4)_5$ (27.54g, 0.0512 mil), oxalic acid (5g) and citric acid (5g) was dissolved in $H_2O$ (200 mL). A slightly turbid deep blue solution was obtained on heating and stirring. When $(NH_4)_2HPO_4$ (20.32g, 0.1536 mil) was added to this solution a light blue precipitate was immediately formed. This was collected after the water had been completely evaporated, ground, placed in a fused quartz crucible and heated to 450° C. at 3° C. $\min^{-1}$ under nitrogen atmosphere and held at that temperature for 10 hours. After the 450° C. heating step, the material exhibited a featureless x-ray diffraction pattern. Product samples were allowed to cool to room temperature, ground, mixed with oxalic acid (2.0g) and reheated to 700° C., 800°, and 900° C. at 25° C. $\min^{-1}$ and held at that temperature for 50 hours. Tables 4, 5, and 6 shows the x-ray diffraction patterns of this material after heating.

TABLE 4

| d | Relative Intensity ($I/I_o$) (100) |
|---|---|
| 6.16 ± 0.03 | w |
| 5.44 ± 0.02 | w |
| 4.29 ± 0.02 | vs |
| 3.857 ± 0.008 | w |
| 3.681 ± 0.008 | m |
| 3.542 ± 0.008 | w |
| 3.348 ± 0.008 | w |
| 3.259 ± 0.08 | w |
| 3.056 ± 0.004 | s |
| 2.961 ± 0.004 | w |
| 2.785 ± 0.04 | w |
| 2.670 ± 0.004 | w |
| 2.481 ± 0.004 | m |
| 1.927 ± 0.002 | w |
| 1.903 ± 0.002 | w |

TABLE 5

| d | Relative Intensity ($I/I_o$) (100) |
|---|---|
| 6.03 ± 0.03 | w |
| 5.97 ± 0.02 | w |
| 5.43 ± 0.02 | w |
| 4.40 ± 0.02 | m |
| 4.28 ± 0.02 | vs |
| 3.847 ± 0.008 | w |
| 3.690 ± 0.008 | w |
| 3.619 ± 0.008 | w |
| 3.250 ± 0.008 | w |
| 3.054 ± 0.004 | m |
| 2.998 ± 0.004 | w |
| 2.956 ± 0.004 | w |
| 2.783 ± 0.004 | w |
| 2.667 ± 0.004 | w |
| 2.479 ± 0.004 | w |
| 1.927 ± 0.002 | w |
| 1.901 ± 0.002 | w |

TABLE 6

| d | Relative Intensity ($I/I_o$) (100) |
|---|---|
| 6.17 ± 003 | m |
| 5.45 ± 0.02 | w |
| 4.42 ± 0.02 | s |
| 4.29 ± 0.02 | vs |
| 3.860 ± 0.008 | w |
| 3.708 ± 0.008 | w |
| 3.630 ± 0.008 | w |
| 3.567 ± 0.008 | w |
| 3.351 ± 0.008 | w |
| 3.260 ± 0.008 | w |
| 3.083 ± 0.004 | s |
| 3.002 ± 0.004 | w |

TABLE 6-continued

| d | Relative Intensity $(I/I_o)$ (100) |
|---|---|
| 2.793 ± 0.004 | m |
| 2.676 ± 0.004 | w |
| 2.508 ± 0.004 | w |
| 2.484 ± 0.004 | w |
| 2.058 ± 0.002 | w |
| 1.970 ± 0.002 | w |
| 1.933 ± 0.002 | w |
| 1.903 ± 0.002 | w |
| 1.857 ± 0.002 | w |
| 1.838 ± 0.002 | w |

2θ range=2.0 –52.0°
Step size=0.04
λ=1.541780
Automatic baseline correction
11 point bimodal smoothing

Example 2

Preparation of $SbVP_3O_{12}$

I. A mixture of $Sb_2O_3$ (14.5g, 0.05 mol), $NH_4VO_3$ (11.7g, 0.1 mol) and $(NH_4)_2HPO_4$ (39.6g, 0.3 mol) was ground, placed in a fused quartz crucible and heated at 3° C. min$^{-1}$ to 500° C. in air. The temperature was held constant for 50 hours and the product cooled to ambient temperature. This was ground finely, reheated to 750° C. in air and held for 10 hours, this was repeated one more time. II. A mixture of $Sb_2O_3$ (14.5g, 0.05 mil), $NH_4VO_3$ (11.7g, 0.1 mil) and $(NH_4)_2HPO_4$ (39.6g, 0.3 mil) was ground, placed in a fused quartz crucible and heated to 450° C. at 1° C. min$^{-1}$ and held at that temperature for 10 hours in air. The green powder was allowed to cool to ambient temperature, ground and reheated to 750° C. at 25° C. min$^{-1}$ and held at that temperature for 15 hours. This was repeated one more time with a 40 hours annealing time. Table 2 shows the x-ray diffraction pattern of this material.

Example 3 Preparation of $SbTi_{0.5}V_{0.5}P_3O_{12}$

A mixture of $Sb_2O_3$ (4.3g, 0.0147 mol), $NH_4VO_3$ (1.73g, 0.0147 mol), $Ti_2(C_2O_4)_3 \cdot 10H_2O$ (4.0g, 0.0074 mol) and $(NH_4)_2HPO_4$ (11.73 mil, 0.0888 mol) was ground and heated to 450° C. at 3° C. min$^{-1}$ and held at that temperature for 10 hours in air. The yellow brown powder was heated to 750° C. at 25° C. min$^{-1}$ and held for 12 hours. The green brown powder was ground and reheated to 800° C. and held for 15 hours. Table 3 shows the x-ray diffraction pattern of this material.

Example 4

Conversion of n-Butane to Maleic Anhydride

Figure 2:
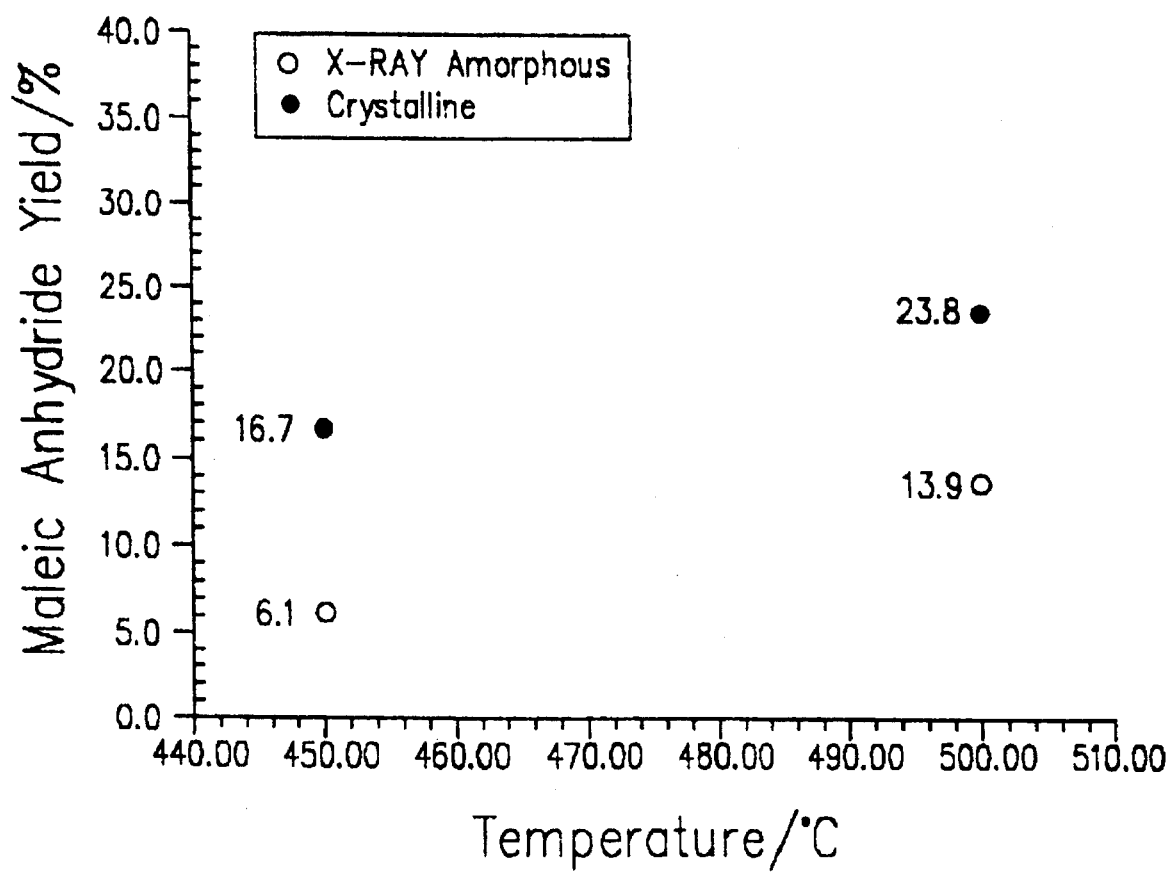
FIG. 2 compares the yield of maleic anhydride from n-butane conversion (y-axis, weight percent) as a function of temperature (x-axis, °C) in the presence of oxygen and two catalyst compositions of the invention. The open circles represent data for conversion in the presence of a material of the invention having the formula $NbV_{0.5}Ti_{0.5}P_3O_x$ which has been heated to a temperature of about 450° C. The solid circles represent data for conversions in the presence of a material having the formula $NbV_{0.5}Ti_{0.5}P_3O_x$ which has been heated to a temperature of at least 700° C.

The materials of Example 1 were evaluated for selective oxidation activity and selectivity using a n-butane feed. The performance of the x-ray amorphous material of Example 1 (which had been heated to a temperature no higher than 450° C.) was compared with that of the crystalline material which had been heated to a temperature of at least 700° C. Results are plotted in FIGS. 1 and 2, and show that heating the material to a temperature of at least about 700° C. improves its activity and selectivity for converting n-butane to maleic anhydride.

Changes and modifications in the specifically described embodiments can be carried out without departing from the scope of the invention which is intended to be limited only by the scope of the appended claims.

What is claimed is:

1. A method for upgrading a hydrocarbon feedstock comprising partially oxidizing said hydrocarbon feedstock in the presence of a composition of matter having the formula $$A_xB_{1-x}V_yC_{1-y}P_3O_{10-15}$$

wherein A is Nb or Ta, B is Sb or As, C is Ti, Zr, Sn or Ge, and $0 \leq x \leq 1$, $0 < y \leq 1$.

2. The method of claim 1 wherein said composition is further characterized by the x-ray diffraction pattern of Table 1.

3. The method of claim 1 wherein said composition is further characterized by the x-ray diffraction pattern of Table 2.

4. The method of claim 1 wherein said composition is further characterized by the x-ray diffraction pattern of Table 3.

5. The method of claim 1 wherein said composition has been heated to a temperature of at least 700° C. and which composition is further characterized by the x-ray diffraction pattern of Table 4.

6. The method of claim 1 wherein said composition has been heated to a temperature of at least 800° C. and which composition is further characterized by the x-ray diffraction pattern of Table 5.

7. The method of claim 1 wherein said composition has been heated to a temperature of at least 900° C. and which composition is further characterized by the x-ray diffraction pattern of Table 6.

8. A method for upgrading a hydrocarbon feedstock comprising partially oxidizing said hydrocarbon feedstock in the presence of a composition of matter having the formula $$M_zA_xB_{1-x}V_yC_{1-y}P_{3-n}Si_nO_{10-15}$$

where M is selected from the group consisting of Cu, Ag, Bi, Na, K, Rb, and Cs, A is Nb or Ta, B is Sb or As, C is Ti, Zr, Sn, or Ge, and $0 \leq x,z \leq 1$, $0 < y \leq 1$, and $0 \leq n \leq 2$.

9. The method of claim 8 wherein said composition is further characterized by the x-ray diffraction pattern of Table 1.

10. The method of claim 8 wherein said composition is further characterized by the x-ray diffraction pattern of Table 2.

11. The method of claim 8 wherein said composition is further characterized by the x-ray diffraction pattern of Table 3.

12. The method of claim 8 wherein said composition of claim 5 has been heated to a temperature of at least 700° C. and which composition is further characterized by the x-ray diffraction pattern of Table 4.

13. The method of claim 8 wherein said composition of claim 5 has been heated to a temperature of at least 800° C. and which composition is further characterized by the x-ray diffraction pattern of Table 5.

14. The method of claim 8 wherein said composition of claim 5 has been heated to a temperature of at least 900° C. and which composition is further characterized by the x-ray diffraction pattern of Table 6.

* * * * *